United States Patent
Shinkai

(10) Patent No.: US 6,913,195 B2
(45) Date of Patent: Jul. 5, 2005

(54) DISCOUNTING SYSTEM, DISCOUNTING DEVICE, DISCOUNTING METHOD, DISCOUNTING PROGRAM, RECORD MEDIUM, CARTRIDGE, PRINT CONTROLLER, PRINT CONTROL METHOD, AND PRINT CONTROL PROGRAM

(75) Inventor: Michinori Shinkai, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 293 days.

(21) Appl. No.: 09/895,184

(22) Filed: Jul. 2, 2001

(65) Prior Publication Data

US 2002/0017570 A1 Feb. 14, 2002

(30) Foreign Application Priority Data

Jul. 3, 2000 (JP) ........................................ 2000-201619
Jun. 27, 2001 (JP) ........................................ 2001-195292

(51) Int. Cl.⁷ ............................................. G06F 7/08
(52) U.S. Cl. ...................... 235/381; 235/375; 235/381; 235/492; 705/14; 358/1.5
(58) Field of Search ................................ 235/375, 381, 235/492; 705/14; 358/1.5

(56) References Cited

U.S. PATENT DOCUMENTS

| | | | | | |
|---|---|---|---|---|---|
| 5,075,875 | A | * | 12/1991 | Love et al. ................. | 358/1.18 |
| 5,589,677 | A | * | 12/1996 | Merchel ...................... | 235/383 |
| 5,822,735 | A | * | 10/1998 | De Lapa et al. .............. | 705/14 |
| 5,924,078 | A | * | 7/1999 | Naftzger ....................... | 705/16 |
| 6,067,524 | A | * | 5/2000 | Byerly et al. .................. | 705/3 |
| 6,129,274 | A | * | 10/2000 | Suzuki ........................ | 235/381 |
| 6,360,206 | B1 | * | 3/2002 | Yamashita .................... | 705/14 |
| 2002/0022990 | A1 | * | 2/2002 | Kurata et al. ................. | 705/14 |

FOREIGN PATENT DOCUMENTS

JP     A-09-114755     5/1997     ........... G06F/13/00

* cited by examiner

*Primary Examiner*—Michael G. Lee
*Assistant Examiner*—Seung H Lee
(74) *Attorney, Agent, or Firm*—Fitzpatrick, Cella, Harper & Scinto

(57) ABSTRACT

A mechanism in which appending information such as a quantity of advertisement information appended to a record medium and its size is previously stored in a memory to determine service contents according to the stored appending information.

65 Claims, 15 Drawing Sheets

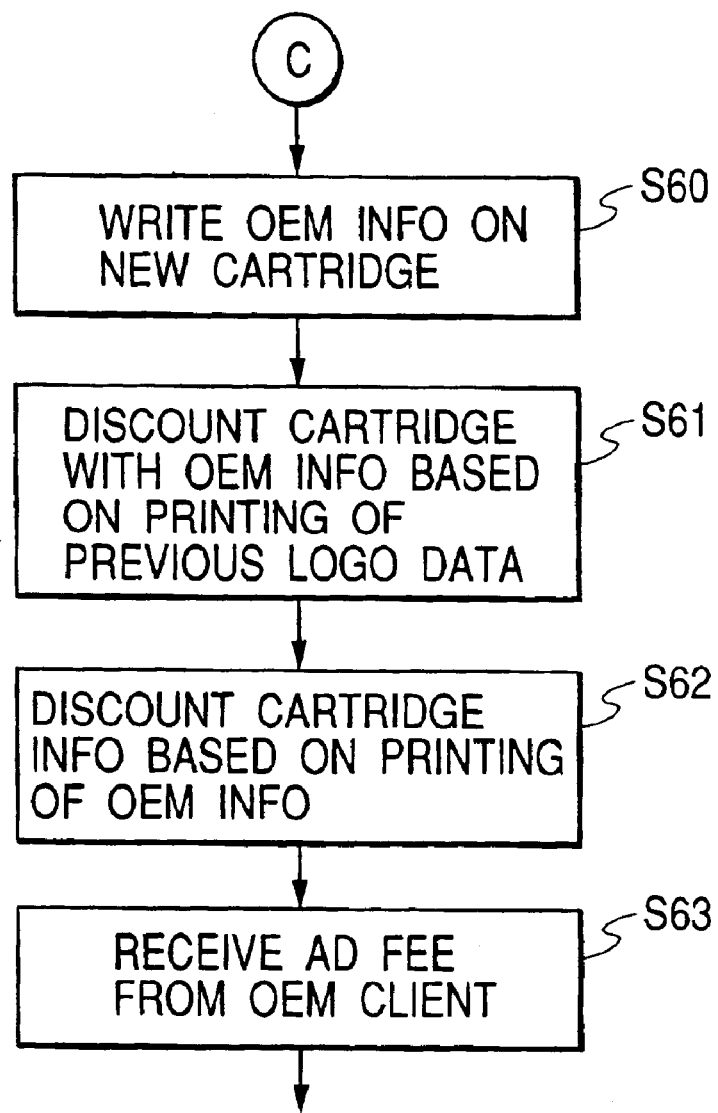

DISCOUNTING SYSTEM, DISCOUNTING DEVICE, DISCOUNTING METHOD, DISCOUNTING PROGRAM, RECORD MEDIUM, CARTRIDGE, PRINT CONTROLLER, PRINT CONTROL METHOD, AND PRINT CONTROL PROGRAM

BACKGROUND OF THE INVENTION

1. Field of the Invention

The present invention relates to an advertisement, and particularly to an advertisement service using a printer or a memory cartridge on which a memory is mounted on a cartridge containing ink or other recording agent and/or paper or other media.

2. Related Background Art

In recent years, there has been suggested a unit on which a memory is mounted on a cartridge containing ink or other recording agent used for printing of a printer. Additionally, it is suggested to store information including the number of prints, the number of printed sheets per sheet size, a manufacturing date, and a product serial number in the mounted memory.

In these conventional technologies, the information stored in the cartridge memory has been mainly used for acquiring operating information of the printer. In this context, for example, there has not been supposed a mechanism in which information stored in a cartridge memory is used for a user service (discount).

Meanwhile, there has been a mechanism in which information stored in a memory is displayed on a display section of a printer or a display of a personal computer, while there has not been supposed a mechanism in which information stored in the memory is printed nor a mechanism for grasping how users printed or utilized information such as advertisements in the cartridge or the printer.

Meanwhile, collecting used devices is very important from the viewpoint of a global environment. Particularly, a life of a printer or lives of consumer goods for use in the printer are relatively short in comparison with those of home appliances such as a television and a refrigerator and it is thus important to improve their salvage rate.

SUMMARY OF THE INVENTION

The present invention has been provided to solve the above problems of the conventional technologies. Therefore it is an object of the present invention to provide a mechanism capable of easily grasping a printing status and utilization information of advertisement information stored in a memory section in a memory cartridge or in a printer.

It is another object of the present invention to provide a mechanism enabling a user to easily achieve a merit, for example, when the user purchases a new article, by calculating discount information according to a printing status of information or advertisement information or according to a utilization status stored in the memory section provided in a memory cartridge or a printer and also a mechanism enabling easy promoting sales, which is advantageous for a supply side of the article.

It is still another object of the present invention to provide a mechanism enabling a supplier of device articles to promote sales and to improve a salvage rate of used devices easily.

According to one aspect, the present invention which achieves these objects related to a mechanism comprising first memory means for storing advertisement information, advertisement appending means arranged in the printer for appending an advertisement based on the advertisement information stored in the first memory means to the media together with a given image to be printed, second memory means for storing the appending information of the advertisement appended by the advertisement appending means to the media, discount ticket issuing means for issuing discount tickets according to the appending information stored in the second memory means, and discount rate determination means for determining a discount rate of a new article purchase price on the basis of the discount ticket issued by the discount ticket issuing means.

According to another aspect, the present invention which achieves these objects related to a mechanism comprising first memory means for storing advertisement information, advertisement appending means for appending an advertisement based on the advertisement information stored in the first memory means to the media together with a given image when the given image is printed, second memory means for storing appending information indicating that the advertisement is appended by the advertisement appending means, acquisition means for acquiring the appending information stored in the second memory means, and discount information determination means for determining discount information according to the appending information acquired by the acquisition means.

According to still another aspect, the present invention which achieves these objects related to a mechanism comprising acquisition means for acquiring appending information of appending an advertisement based on advertisement information stored in a memory section of a cartridge mounted on a printer with a given image on media from the memory section of the cartridge and discount information determination means for determining discount information on the basis of the appending information acquired by the acquisition means.

According to a further aspect, the present invention which achieves these objects related to a cartridge detachably mounted on a printer, comprising recording agent container means for containing an recording agent for printing on media and memory means for storing appending information of appending an advertisement based on advertisement information stored in a given memory section to the media together with the given image when the given image is printed, wherein the appending information stored in the memory means is read by a reader and used for determining discount information by using the reader.

According to still another aspect, the present invention which achieves these objects related to a mechanism comprising readout means for reading out advertisement information stored in first memory section, print control means for printing and controlling the advertisement information read out by the readout means, and memory control means for storing appending information indicating an appending status of an advertisement based on the advertisement information stored in the first memory section into second memory section arranged in a cartridge detachably mounted on a printer, wherein the appending information is used for determining discount information.

Other objects and features besides those discussed above shall be apparent from the description of preferred embodiments and accompanying drawings of the invention which follow.

BRIEF DESCRIPTION OF THE DRAWINGS

FIG. 13 is a flowchart of a processing system for rewriting information for an advertisement when there is no medium according to a sixth embodiment.

DETAILED DESCRIPTION OF THE PREFERRED EMBODIMENTS

The preferred embodiments of the present invention will now be described in detail hereinafter with reference to the accompanying drawings. It should be noted, however, that sizes, materials, shapes, and relative arrangements of components described in these embodiments are not shown for limiting a scope of the present invention to those only, unless otherwise specified.

(First Embodiment)

Figure 1:
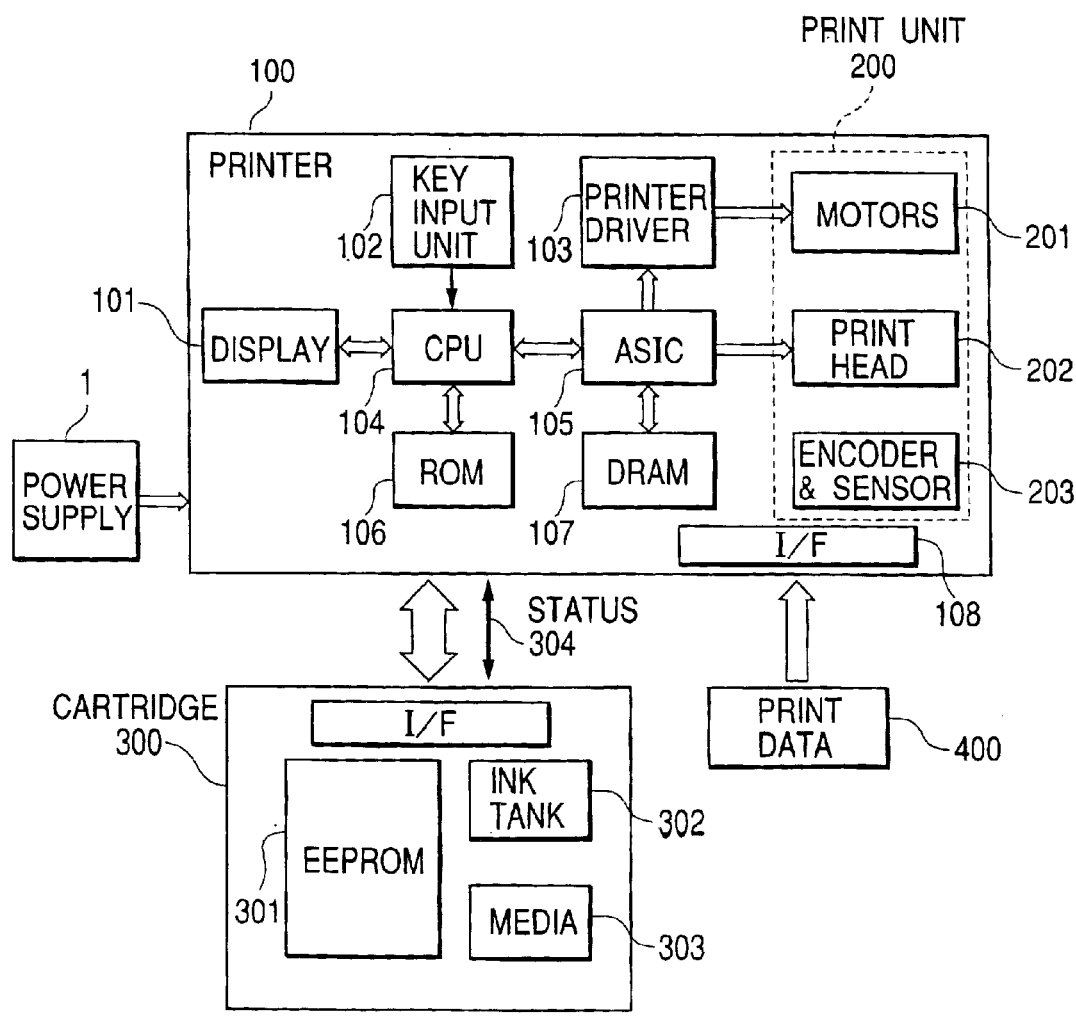
FIG. 1 is a block diagram showing a printer and a cartridge according to a first embodiment.

Hereinafter, a first embodiment will be described below by using accompanying drawings. Referring to FIG. 1, there is shown a block diagram illustrating an entire configuration of the first embodiment.

In FIG. 1, a printer 100 is shown. The printer according to the present invention is not limited to a particular recording method, but it is assumed to be of various types of recording method such as, for example, well-known ink jet, laser beam, or heat-transfer recording method. Hereinafter, a description will be made below by giving an example of a printer using an ink jet recording method as a preferred embodiment.

The printer 100 comprises a CPU 104 for operating hardware controls, an ASIC 105, a ROM 106 storing programs for executing software processing, a key input unit 102 for selecting an image to be printed, a DRAM 107 which is a memory for storing the image designated to be printed or for converting it to print head information of the printer 100 before printing, a display 101 for showing a display status of a print head 202 or the like to a user, a printer driver 103 for driving a print unit 200, and an I/F 108 to be an entry for taking in print data 400 which is image data externally (a PC, a card, etc.), where the CPU 104 and the DRAM 107 form a print controller. It is assumed that the ROM 106 are stored with program codes for executing a series of operations in flowcharts according to the first to sixth embodiments described below and that the CPU 104 executes processing based on the program codes.

The print unit 200 arranged in the printer 100 comprises various motors 201 for the printer, a print head 202 for printing with ink as a recording agent on media, and an encoder and sensor control system 203 for controlling the motors 201 and the print head 202.

Figure 2:
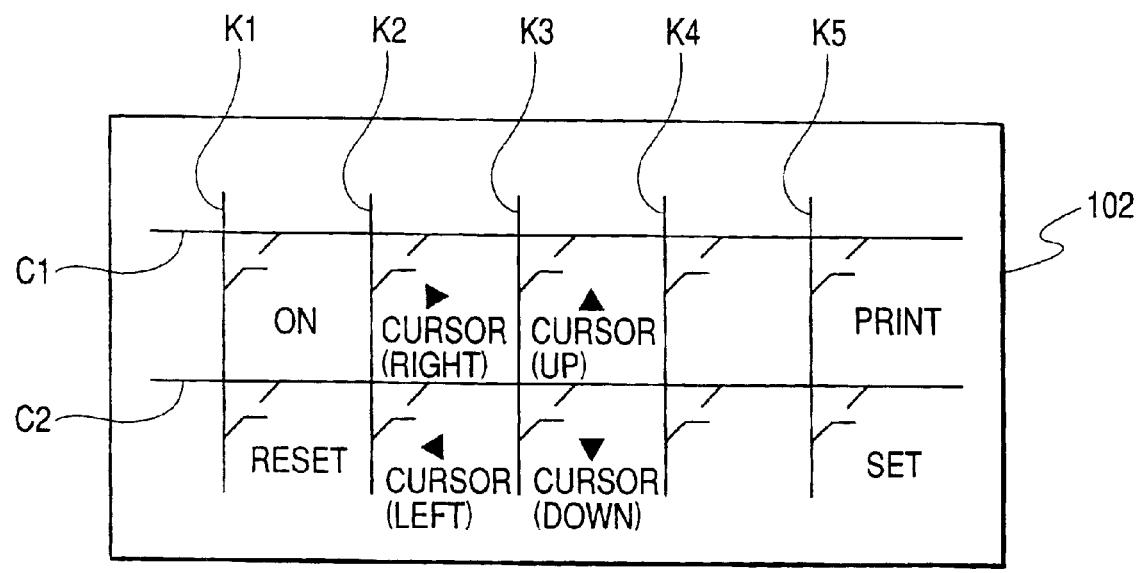
FIG. 2 is a configuration diagram showing a key input unit according to the first embodiment.

The key input unit 102 comprises a matrix circuit shown in FIG. 2. This matrix circuit is used for a general key input unit, having matrix signals K1 to K5 and C1 to C2 for detecting operations of respective keys; for example, if a matrix signal which is set on is K1, C2, the operation is determined to be "reset". Power for those components of the printer 100 is supplied from power supply 1 shown in FIG. 1.

Furthermore, a description will be given below for a cartridge 300, which is an important portion in a configuration of this embodiment.

The cartridge 300, which is detachably mounted on the printer 100, comprises a nonvolatile memory (for example, EEPROM 301) for storing a condition of the printer 100, media 303 which are printing media such as sheets, an ink tank 302 containing reserve ink to be supplied to the print head 202, and data signals or status signals (simply indicated by a STATUS signal 304 in this diagram) exchanged to or from the I/F for various negotiations with the printer 100. The cartridge memory (or memory cartridge) used in the present invention is a cartridge which has a nonvolatile memory for storing predetermined information and contains recording agent, such as ink and toner, and print media (paper), and which may be detachably mounted to an apparatus having a printing function, such as shown in FIG. 1. Another type of cartridges which contain either one of the recording agent and the print media can also be used in the present invention. While the media 303 are shown as if they were included in the cartridge in FIG. 1, the present invention can be realized according to an embodiment in which they are separated from the cartridge. In addition, the ink tank 302 serving as a container of the recording agent is used as a toner container for a laser beam printer.

Then, the cartridge controls a supply of print media in response to a feed request of the media 303 from the printer 100 or performs control operations such as reading out logo data which is advertisement information from a data area of the EEPROM 301 with an instruction from the printer 100 and then transmitting it to a given memory of the printer 100. It should be noted that the advertisement information in the present invention means information having an advertisement effect and should be assumed to include advertisement information of advertising for a part-timer, for example.

Figure 3:
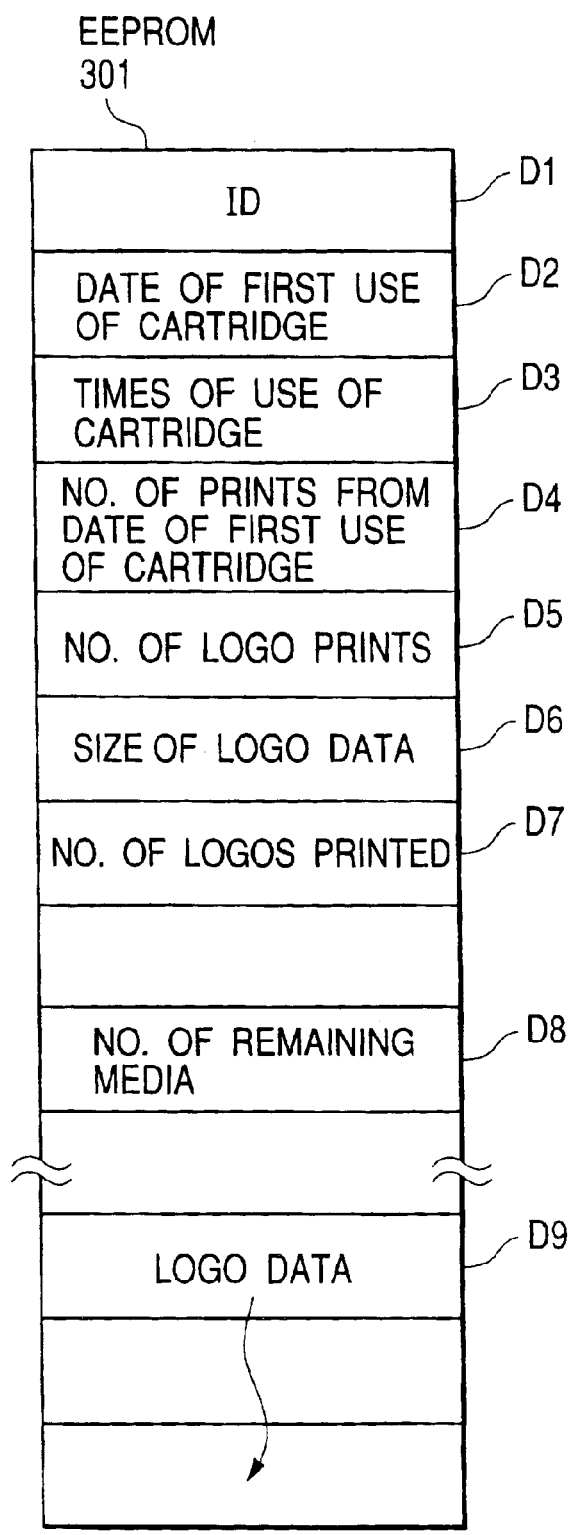
FIG. 3 is a model diagram showing data areas for various types of information stored in an EEPROM mounted on the cartridge according to the first embodiment.

The EEPROM 301, which is a nonvolatile memory, has data areas as shown in FIG. 3.

The data areas in FIG. 3 are used for storing ID information of the cartridge 300 in D1, information of a date of the first use of the cartridge in D2, information of the number of times of use of the cartridge in D3, the number of prints from the date of the first use of the cartridge in D4, information of the number of logo prints in D5, information of a size of logo data in D6, information of the number of logos printed for the cartridge in D7, information of the number of remaining media in the cartridge in D8, and logo data information in D9. The D9 is a first memory section; information to be stored therein can be character information, image information, or image information including both of character and image information only if it is advertisement information and storing the information promotes an advertisement effect to a user. In addition, a second memory section includes D5, D6, D7, etc., which can be used to record a printing status or an application condition of more detailed user memory information.

Figure 4:
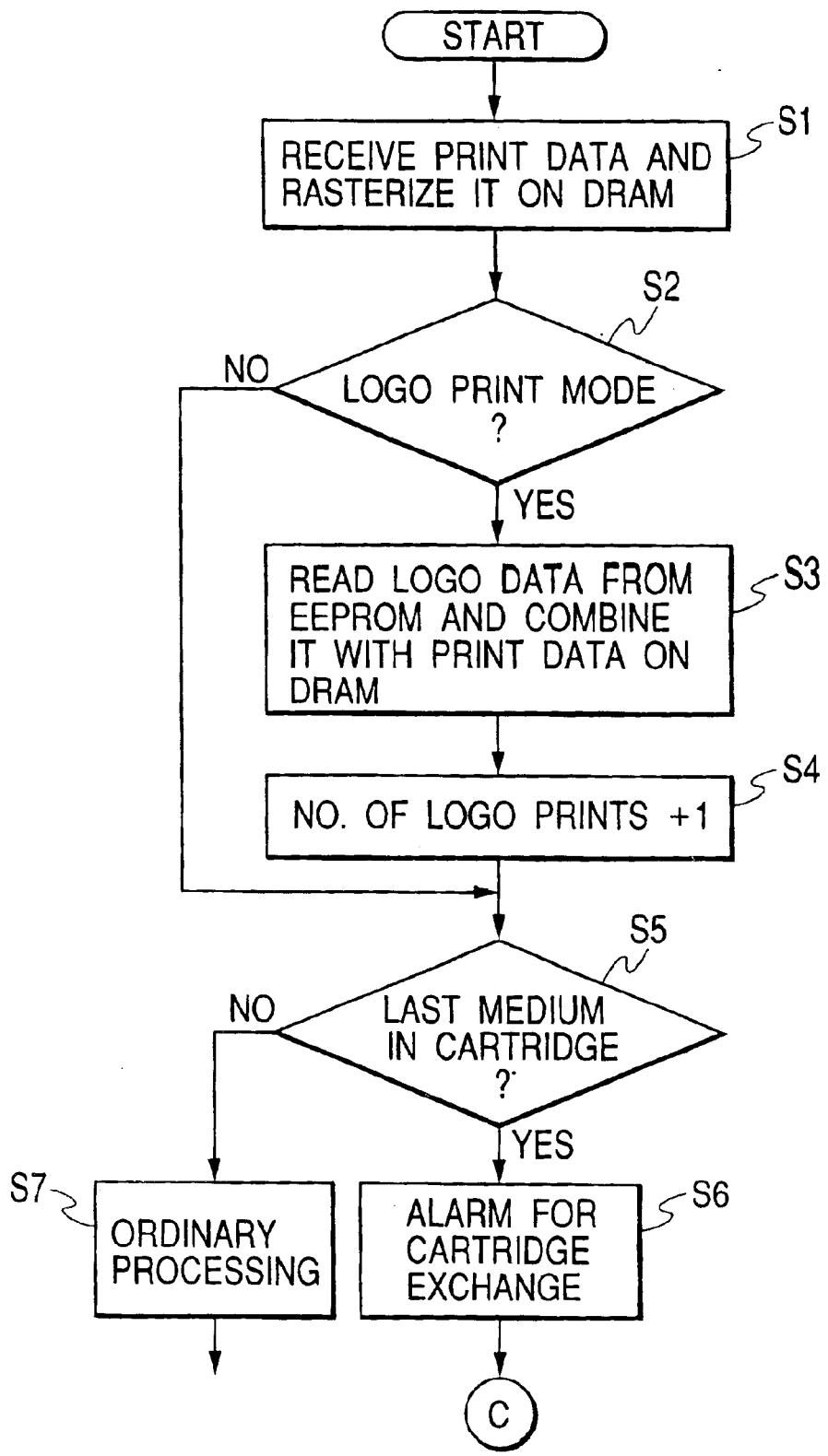
FIG. 4 is a flowchart of a processing system according to the first embodiment.

Next, a flow of processing up to outputting advertisement information in this embodiment to the media will be described in detail below by using FIG. 4 and FIG. 5. In this embodiment, the processing in each step of the flowchart in FIG. 4 is assumed to be performed by the CPU 104 with reading a program code stored in the ROM 106 (nonvolatile memory) and executing processing based on the read program code as described by referring to FIG. 1. In this context, the ROM 1106 is not limited to a read-only nonvolatile memory, but can be replaced by a readable/writable nonvolatile memory. It is assumed to be true in FIG. 8, FIG. 9, FIG. 10, and FIG. 11A described later.

In FIG. 4, print data of the image selected as described in the above is stored in the DRAM 107 of the printer 100 via the I/F 108 in step S1.

Subsequently in step S2, it is determined whether logos should be printed from logo data stored in the EEPROM 301 of the cartridge 300 when the selected image is printed to the media 303 mounted on the cartridge 300.

In other words, the printer 100 is provided with a mode selector for selecting either of a mode in which a logo is appended on media by means of the advertisement appending unit and a mode in which no logo is appended for printing, and a user selects and determines which mode should be used for printing. Then, the printer determines an input according to a user's selecting instruction.

If it is determined that the mode in which no logo is printed is selected in the step 2, the control jumps to step S5.

If it is determined that the mode in which a logo is printed is selected in the step 2, the control progresses to step S3.

In the step S3, logo data (in the data area D9 in FIG. 3) stored in the EEPROM 301 is read out to be stored in the DRAM 107 and then combined with a previously stored image.

Next, in step S4, the number of log prints (D5) is incremented as appending information of the advertisement whose storage area exists in the EEPROM 301 of the cartridge for maintaining the storage.

Furthermore, in the step S5, data of the number of remaining media (D8) stored in the EEPROM 301 is read out and then it is determined whether the number of remaining media indicates that only the last medium remains in the cartridge. In this context, the data of the number of remaining media is data stored in D8 shown in FIG. 3 and a value of D8 is updated to a value incremented whenever printing is performed. Instead, the value in D8 can be decremented from a default value.

Unless the media to be printed now is the last one of the media 303 in the cartridge 300 in the step S5, "ordinary processing" is performed in step S7. The "ordinary processing" in this context is to update and print information stored in the EEPROM 301 in the cartridge 300 and required to be updated with the printing.

If the media to be printed now is the last one of the media 303 in the cartridge 300 in the step S5, an alarm display is performed by using a display 101 of the printer 100 in FIG. 1 to indicate that there is no media 303 in the cartridge 300 in step S6 and to make an instruction of an exchange for the media 303.

The exchange of the media 303 in this embodiment means an exchange of the cartridge 300. The cartridge 300 is used up when there is no remaining media 303 and therefore a new cartridge 300 must be purchased.

Subsequently, a description will be made below for a case in which a user brings a used cartridge 300 to a cartridge store for an exchange.

The used cartridge 300 without media 303 has the number of logo prints, the number of times of use of the cartridge 300, and the like already stored in the EEPROM 301 on the cartridge 300.

Figure 5:
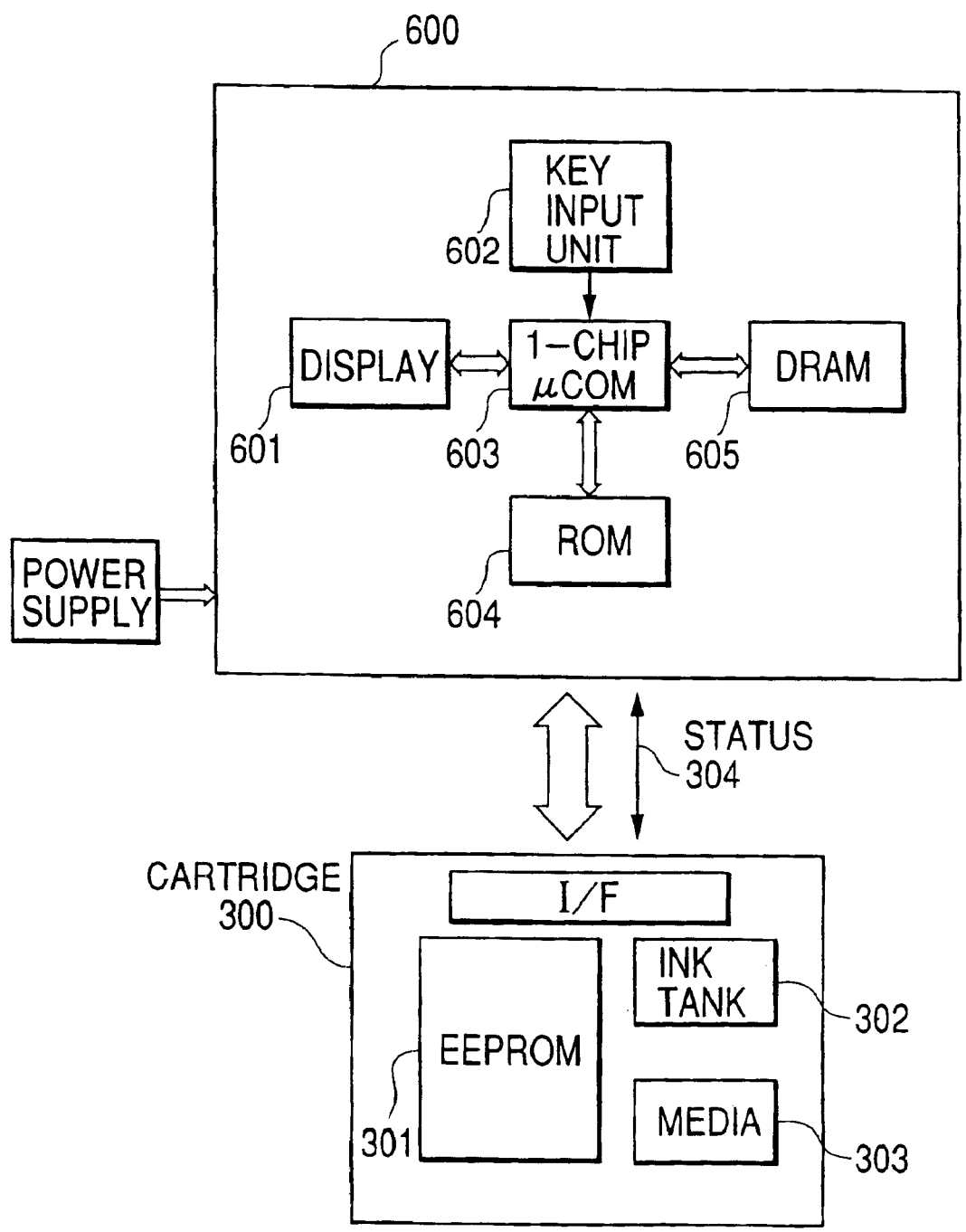
FIG. 5 is a block diagram showing an EEPROM stored information reader (OEM advertisement information writer) according to the first embodiment.

If a user brings this used cartridge 300 to the store, desired information (the number of logo prints in this embodiment) is read from the used cartridge 300 brought by the user with the EEPROM stored information reader 600 for reading the stored data in the data areas in the EEPROM 301 of the cartridge 300 as shown in FIG. 5.

This EEPROM stored information reader 600 comprises a 1-chip μcom 603, a ROM 604 for storing a control program for executing the read processing, a DRAM 605 for storing data read from the cartridge 300, a display 601 for displaying the read data, and a key input unit 602 for processing such as activating a device to start the read processing.

The number of logo prints read from the used cartridge 300 by the EEPROM stored information reader 600 is then inputted to a computer which is not shown and the computer calculates a discount rate at purchasing a new cartridge 300 on the basis of the number of logo prints to determine a purchase price. The computer can be a general information processing device and the information processing device is assumed to be connected to the EEPROM stored information reader 600 via a communication line. The communication line is assumed to be an Internet circuit utilizing a cable complying with an RS-232C interface or a public data network independently of whether it is wireless or wired. While the following embodiments are described by giving an example of a cartridge to be discounted, an object of the discount is not limited to this, but a discount rate can be determined for a printer or other articles different from the cartridge, for example. Furthermore, a point-add embodiment is assumed besides the discount rate; for example, an embodiment in which a user can get a given service (a discount or a free provision of an article) when a given number of points are accumulated. In other words, the present invention is characterized by a determination of discount information according to appending information such as the number of advertisement prints.

The number of logo prints can be directly transmitted with the EEPROM stored information reader 600 directly connected to the computer via a cable or the like or can be inputted to the computer by a staff dealer while viewing a screen of the display 601 of the EEPROM stored information reader 600.

In addition, the computer has a discount rate determiner. This discount rate determiner is not limited to a determination of a discount rate, but functions as a discount information determiner for determining (calculating) given discount information according to how many times the user printed (used) the advertisement.

The discount rate at purchasing the new cartridge 300 is determined by the computer by using a method of calculating the discount rate based on the number of logo prints by a given amount per logo print or a method by a given amount per logo print increased as the number of logo prints increases.

Then, the purchase price of the new cartridge 300 is discounted by the determined discount rate and the new cartridge 300 is sold to the user who has brought the used cartridge in this mechanism.

In other words, the price of the cartridge purchased anew is discounted according to the number of logo prints printed by the user.

A use of this discounting system of the cartridge 300 enables the equipment supply side to cause an advertisement of its own company to be appended in printing with a printed matter whenever a user performs printing, thus increasing an advertisement effect.

On the other hand, the user side can inhibit the printing of the advertisement information from the equipment supply side. Instead, the user must purchase a new cartridge at a fixed price at the cartridge exchange. If the advertisement information is printed, however, the new cartridge 300 can be discounted at an exchange of the cartridge 300 according to the extent.

In this manner, this mechanism causes merits in both of the equipment supply side and the user side.

In addition, the user brings the used cartridge 300 to the shop for the discount and thus there are merits in both of the equipment supply side and the environmental aspect from a viewpoint of recycling of the cartridge 300.

This mechanism will be described by giving an example of normal printing (FIGS. 6A and 6B) and an example of printing a logo (advertisement information) (FIGS. 7A to 7E) of this embodiment.

Figure 6A:
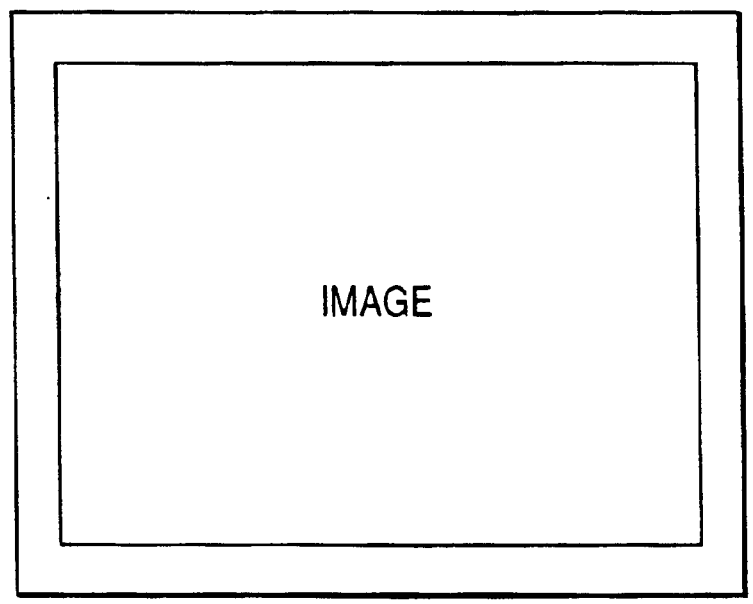
FIGS. 6A and 6B are sample prints of media where an image is normally printed.
Figure 6B:
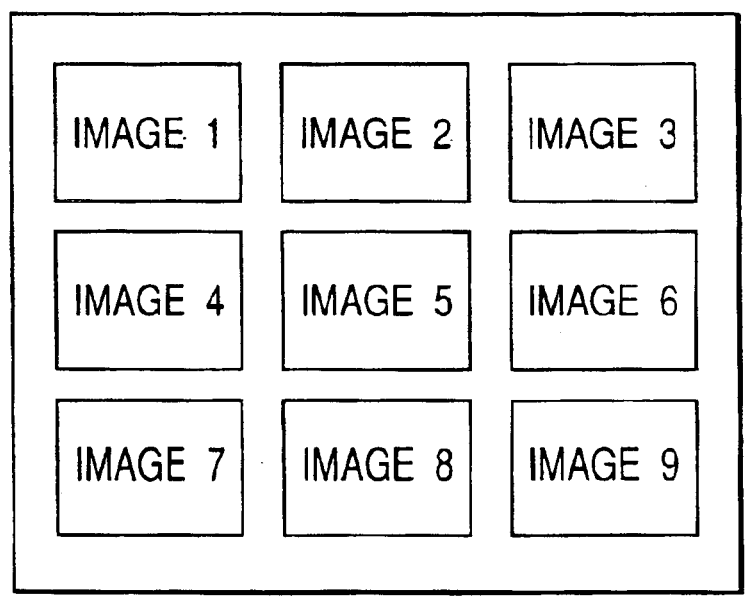

FIG. 6A is a printing example of printing a single image on a sheet of media and FIG. 6B shows an example of thumbnail prints in which a plurality of images are printed on a sheet of media.

Figure 7A:
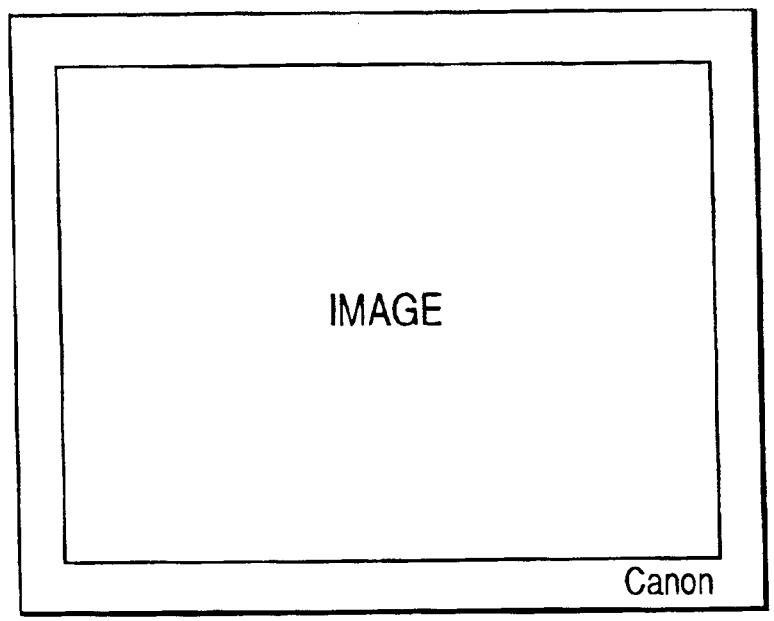
FIGS. 7A, 7B, 7C, 7D and 7E are sample prints of media to which an advertisement is appended with an image according to the first embodiment.
Figure 7B:
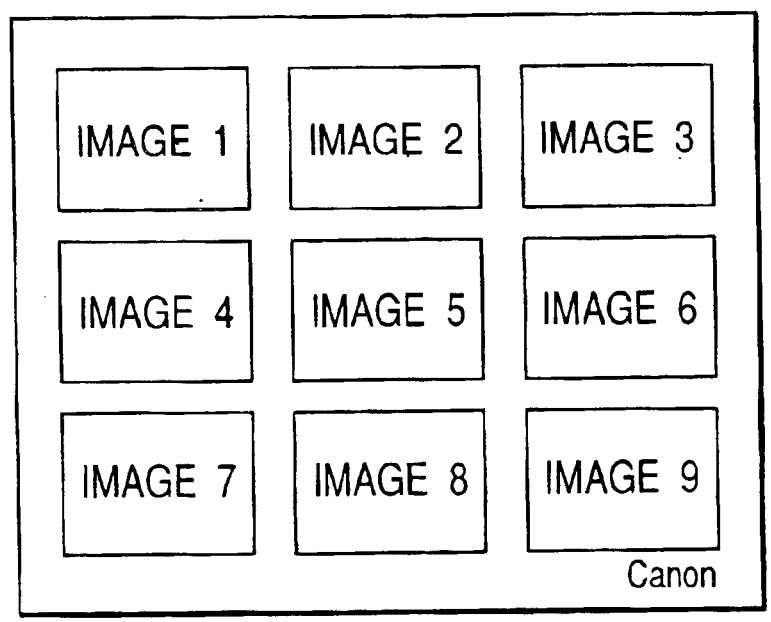

FIG. 7A shows an example of printing with a logo (advertisement information) when a user specifies printing of an image on a sheet of media and FIG. 7B shows thumbnail prints like ones in FIG. 6B other than a single image printed on a sheet of media, which is an example of printing with logo (advertisement information) when a user specifies printing of a plurality of images.

Figure 7C:
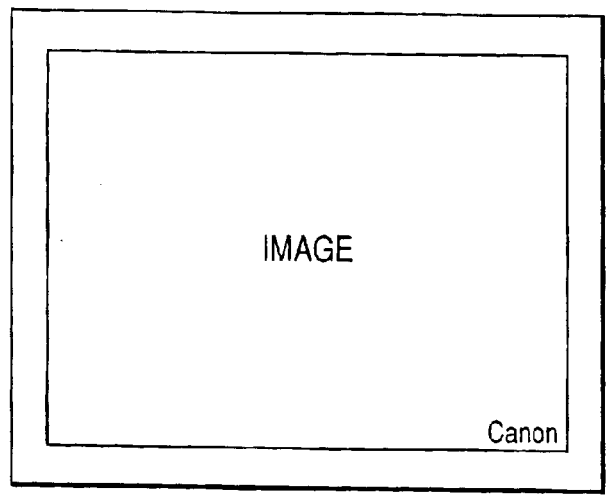
Figure 7D:
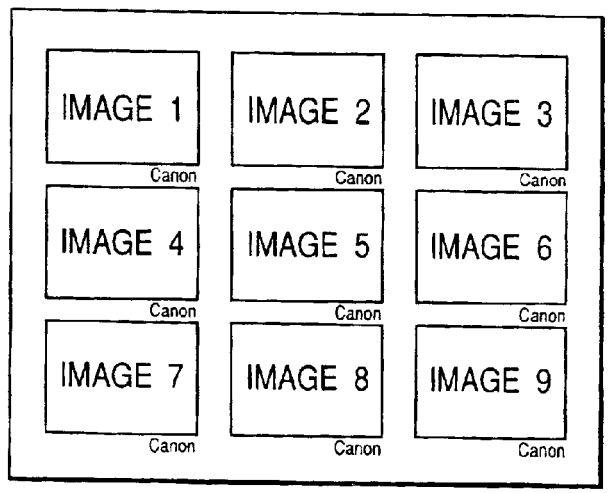
Figure 7E:
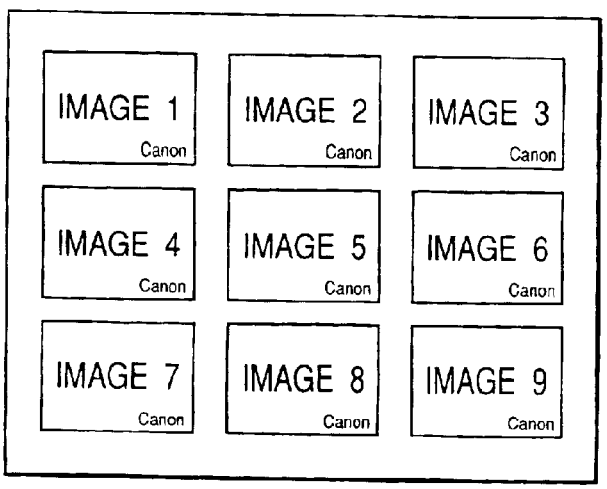

Furthermore, the arrangement of the logo (advertisement) can be changed as shown in FIGS. 7C to 7E.

A user can specify a change of the arrangement of the logos (advertisement) in the step S3 shown in FIG. 4.

In addition, while the number of remaining the media 303 is read out at every printing from the EEPROM 301 in this embodiment, it is also possible to use a method of storing the number of remaining the media 303 in a work area on the DRAM 107 of the printer 100 when the cartridge 300 is mounted, updating the work area, and then writing the information into the predetermined data area on the EEPROM 301 of the cartridge 300 at printing on the last medium.

While the computer has the discount rate determiner in this embodiment, a staff dealer can determine a discount rate of a purchase price of a new cartridge 300.

The mechanism which has been described above makes it possible to store appending information which indicates how many times a user printed (used) the advertisement in the memory section provided in the cartridge, thus enabling service providing according to the appending information. Furthermore, in an arrangement in which the appending information is stored in the memory section provided in an article for consumption such as a cartridge, it is easy to cause a user to salvage cartridges spontaneously, thus improving a salvage rate and enabling a provision of a mechanism contributing to an improvement of a global environment.

(Second Embodiment)

In a second embodiment, the same processing as for the first embodiment is performed until the media 303 in the cartridge 300 are used up. In other words, the same processing of the steps S1 to S7 in FIG. 4 is performed. Therefore, the description of the processing and the configurations of the printer 100 and the cartridge 300 is omitted here.

Figure 11A:
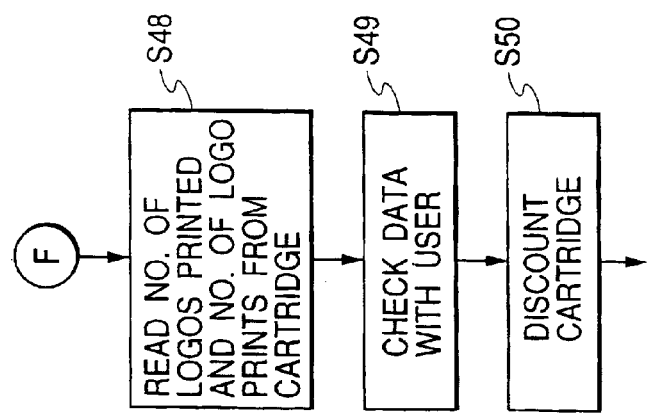
FIGS. 11A, 11B, 11C, and 11D are flowcharts of processing systems applied when there is no medium according to a second embodiment, a third embodiment, a fourth embodiment, and a fifth embodiment, respectively.

Processing after the media 303 in the cartridge are used up is different from that of the first embodiment and therefore the subsequent processing is described by using FIG. 11A. It is assumed here that processing of each step in flowcharts shown in FIGS. 11A to 11D is carried out by an execution of processing based on the program codes stored in a nonvolatile memory (ROM 604) with a central processing unit (1-chip $\mu$com 603) provided in equipment (an EEPROM stored information reader 600) which is the subject of the processing. Processing of FIGS. 11B to 11D will be explained later. It should be noted that, however, an article is assumed to be purchased with a user discount service in the processing in FIGS. 11B to 11D.

Figure 12A:
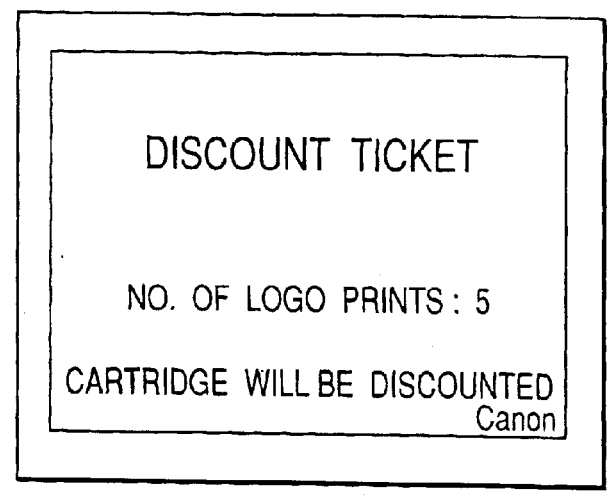
FIGS. 12A, 12B, and 12C are model diagrams showing a discount ticket issued with appending information of an advertisement, a multiple cutoff-type discount ticket having a different number of tickets, and a discount ticket issued with appending information of an advertisement and with ID information of a printer which has printed the information.

In FIG. 11A, when printing on the last one of the media 303 in the cartridge 300, a discount ticket where the number of logo prints (information for determining a discount rate is assumed to be the same as for the first embodiment here) is printed on the medium as shown in FIG. 12A is automatically issued from a printer 100 (S40) by using normally unused "reserved media" contained in the cartridge 300 (the media may be protection media for media used for actual printing) after a completion of printing an image on the last one of the media 303 in the step S40.

Subsequently for purchasing a new cartridge 300 at a cartridge store, a user brings the discount ticket to the store, a discount rate is determined on the basis of the number of logo prints printed on the discount ticket, and a purchase price of the new cartridge 300 is discounted at the determined discount rate before the new cartridge 300 is sold to the user who has brought the discount ticket (S41) in this mechanism.

The number of logo prints printed on the discount ticket is inputted into a computer which is not shown and then the computer calculates a discount rate at purchasing the new cartridge 300 on the basis of the number of logo prints to determine the purchase price.

In this context, there are several methods of inputting the number of logo prints into the computer; a method in which a staff dealer inputs the number of logo prints which has been directly printed and a method in which the computer acquires the number of logo prints using a reader on condition that the number of logo prints printed on the discount ticket is a code such as a bar code. The processing of S41 shown in FIG. 11A can be replaced by processing in which a discount rate is determined according to appending information such as the number of logo prints inputted to the computer. If the latter is applied, the subject of the processing of S41 is the EEPROM stored information reader 600.

(Third Embodiment)

A third embodiment will be described in detail below by using FIGS. 3, 5, 8, and 11B. In this embodiment, configurations of a printer 100 and a cartridge 300 are the same as for those in the first embodiment and therefore their description is omitted here.

Figure 8:
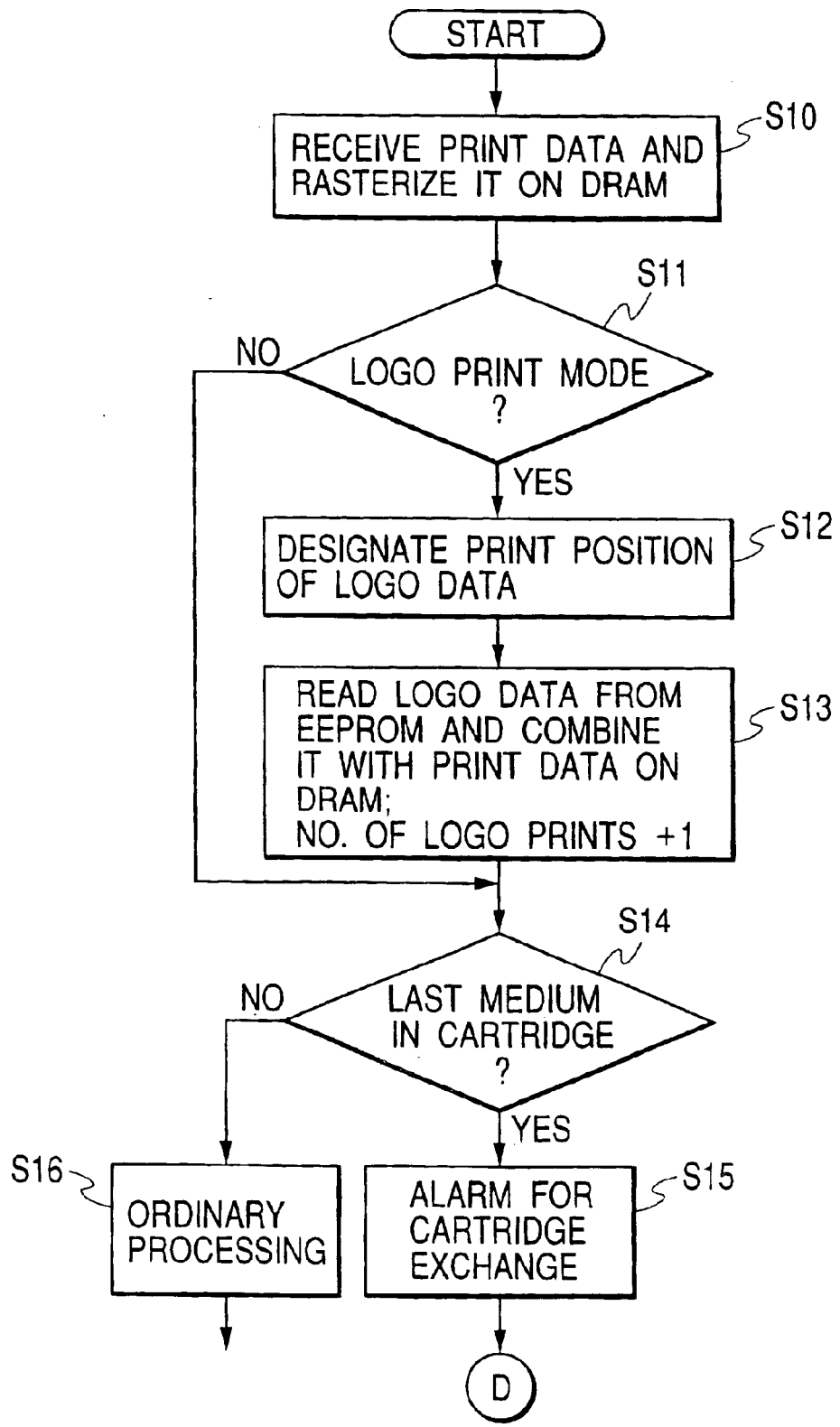
FIG. 8 is a flowchart of a processing system according to a third embodiment.

In FIG. 8, processing in steps S10 and S11 is the same as for the steps S1 and S2 of the first embodiment and therefore the description is omitted.

If the logo print mode is selected in the step S11, the control progresses to step S12 to designate a position on media where logo data (stored in the data area of D9 in FIG. 3) in EEPROM 301 should be arranged for synthesization.

In step S13, logo data is read out on the area designated in the step S12 to be synthesized with image data printed now and then a logo printing counter is incremented by one (+1) as the number of logo prints on the EEPROM 301 of the cartridge 300.

The next and following processing of steps S14, S15, and S16 is the same as the processing of the steps S5, S6, and S7 of the first embodiment and therefore the description is omitted here.

Subsequently, a description will be made below for a case in which a user brings a used cartridge 300 to a cartridge store for an exchange.

Figure 11B:
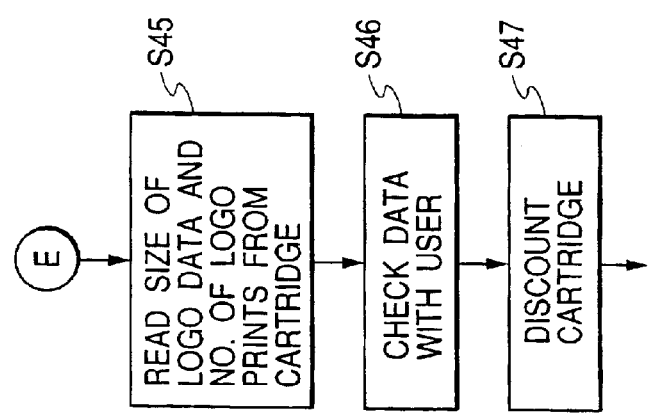

As shown in FIG. 11B, if a user brings a cartridge having no media to a cartridge store, the EEPROM stored information reader 600 described in the first embodiment reads out desired information (the number of logo prints in this embodiment) from a memory section of the used cartridge 300 brought by the user in step S42.

Figure 12B:
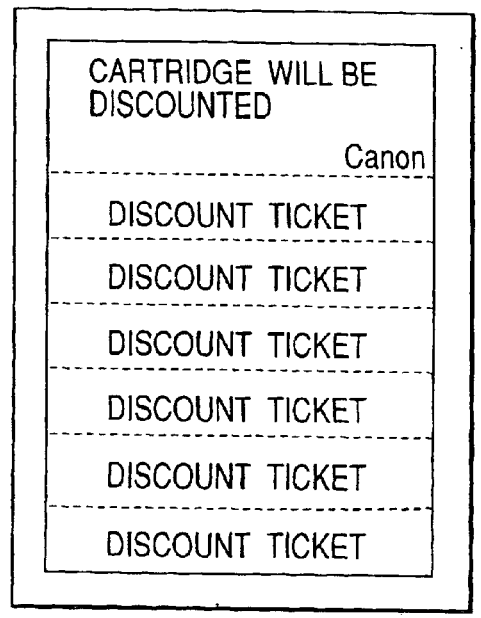
Figure 12C:
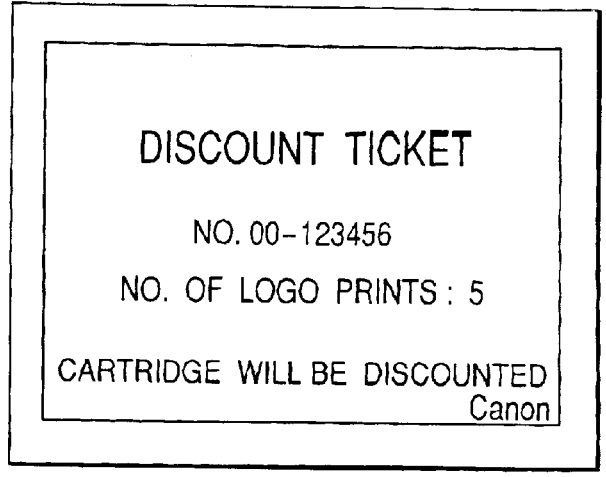

Subsequently, the number of logo prints of the used cartridge 300 is checked in addition to a user in step S43, a discount ticket as shown in FIGS. 12A to 12C is issued on the basis of the number of logo prints, a discount rate is determined on the basis of this discount ticket, and a price of a cartridge 300 purchased anew is discounted at the determined discount rate in step S44 in this mechanism. The user check in S43 is equivalent to processing such as, for example, reading an ID or the like stored in a member card made of a magnetic card brought by the user by using an information processing unit (corresponding to the EEPROM stored information reader 600) and causing the information processing unit to determine whether the ID indicates a registered user. The same processing is applicable to the user check in S46 and S49.

In the above, FIG. 12B shows cutoff-type discount tickets and the number of the discount tickets depends upon the number of logo prints. Furthermore, FIG. 12C shows a discount ticket where an ID of the printer 100 having contained the used cartridge 300 is also recorded. From the discount ticket shown in FIG. 12C, the dealer is informed of when the printer 100 used for printing has been manufactured.

(Fourth Embodiment)

A fourth embodiment will be described in detail below by using FIGS. 3, 5, 9, and 11C. Configurations of a printer 100 and a cartridge 300 in this embodiment are the same as those of the first embodiment and therefore their description is omitted here.

Figure 9:
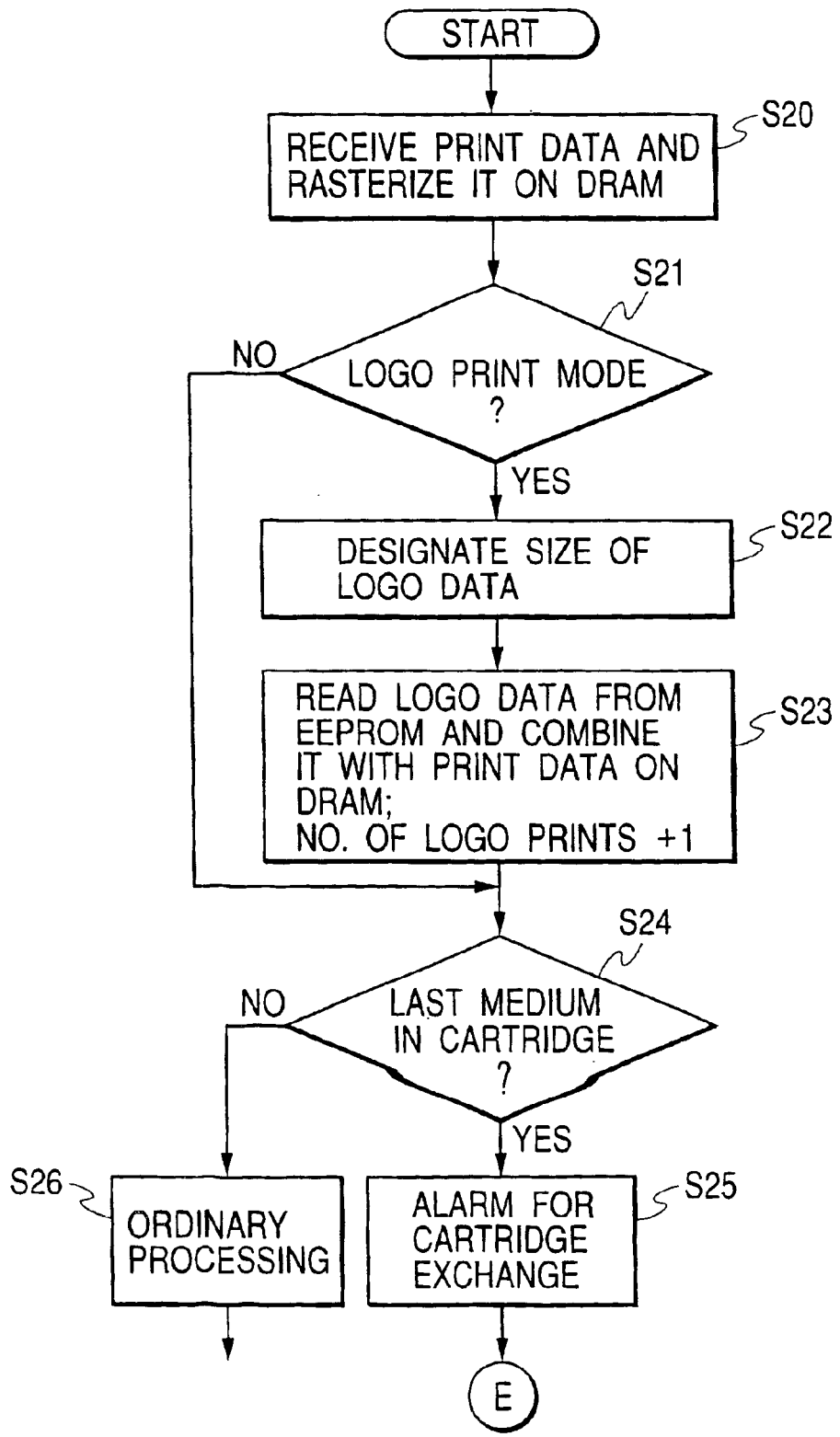
FIG. 9 is a flowchart of a processing system according to a fourth embodiment.

In FIG. 9 processing in steps S20 and S21 is the same as for the steps S1 and S2 in the first embodiment and therefore the description is omitted.

If the logo print mode is selected in the step S21, the control progresses to step S22 to designate a position on media where the logo data where logo data (stored in the data area of D9 in FIG. 3) in EEPROM 301 should be arranged for synthesization and to determine a size of the logo data at printing.

In step S23, logo data is read out on the area designated in the step S22 to be synthesized in the designated logo data size with image data printed now and then a logo printing counter is incremented by one (+1) as the number of logo prints on the EEPROM 301 of the cartridge 300.

The next and following processing of steps S24, S25, and S26 is the same as the processing of the steps S5, S6, and S7 of the first embodiment and therefore the description is omitted here.

Subsequently, a description will be made below for a case in which a user brings a used cartridge 300 to a cartridge store for an exchange.

Figures 11C, 11D:
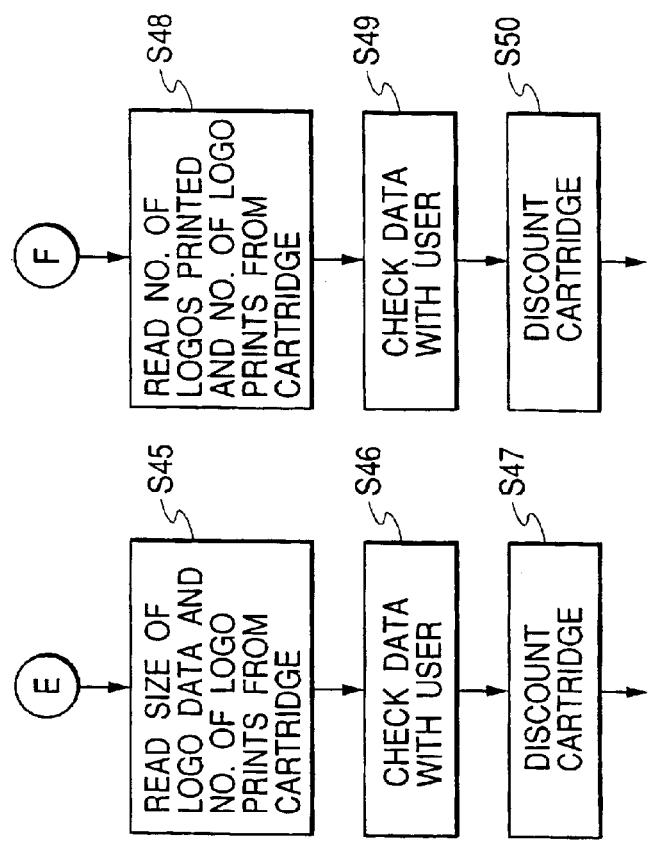

As shown in FIG. 11C, if a user brings a cartridge having no media to a cartridge store, the EEPROM stored information reader 600 described in the first embodiment reads out desired information (the size for printing the advertisement and the number of prints in this embodiment) from the used cartridge 300 brought by the user in step S45.

Subsequently, the size of the printed advertisement is checked for the used cartridge 300 in addition to a user in step S46 and a discount ticket as shown in FIGS. 12A to 12C is issued on the basis of the size of the printed advertisement, a discount rate is determined on the basis of this discount ticket, and a price of a cartridge 300 purchased anew is discounted at the determined discount rate in step S47 in this mechanism.

In other words, this embodiment is a discounting system in which a discount rate depends upon the total sum of the size of the output logos (advertisements) at printing and the number of the prints if the media 303 in the cartridge 300 are used up.

To determine the size of the logo (advertisement information) print, the size is determined based on a table retained in the printer or the computer in the salvage side by means of grades by which the size is larger than the table. It is, however, not limited to this, but two grades can be applied.

(Fifth Embodiment)

A fifth embodiment will be described in detail below by using FIGS. 3, 5, 9, and 11D. Configurations of a printer 100 and a cartridge 300 in this embodiment are the same as those of the first embodiment and therefore their description is omitted here.

Figure 10:
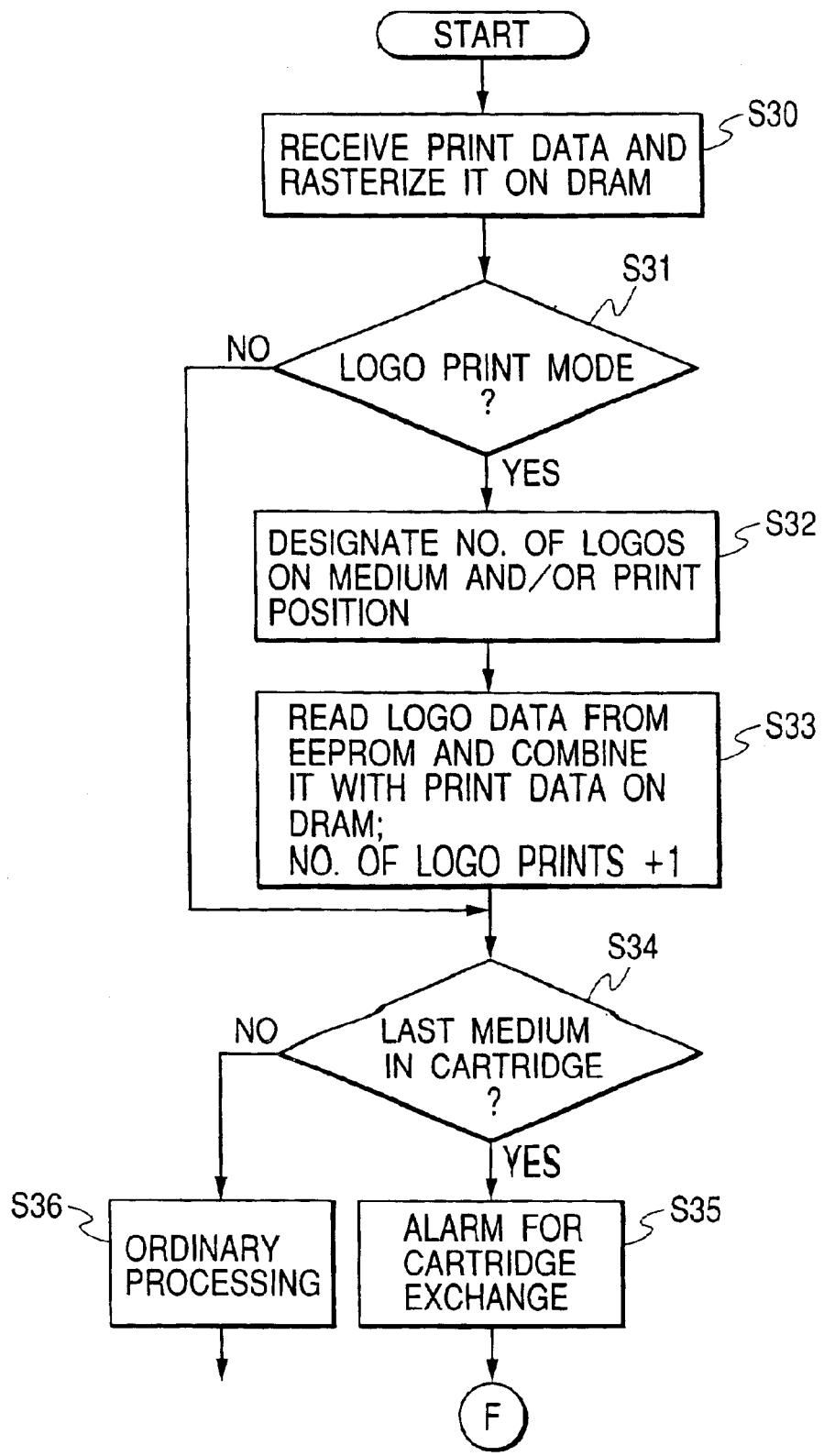
FIG. 10 is a flowchart of a processing system according to a fifth embodiment.

In FIG. 10 processing in steps S30 and S31 is the same as for the steps S1 and S2 in the first embodiment and therefore the description is omitted.

If the logo print mode is selected in the step S31, the control progresses to step S32 to designate a position on media where the logo data where logo data (stored in the data area of D9 in FIG. 3) in EEPROM 301 should be arranged for synthesization and the number of logos.

In step S33, logo data is read out on the area designated in the step S32 to be synthesized with image data printed now and then a logo printing counter is incremented by one (+1) as the number of logo prints on the EEPROM 301 of the cartridge 300. In FIGS. 7D and 7E, for example, the counter is incremented by nine (+9).

The next and following processing of steps S34, S35, and S36 is the same as the processing of the steps S5, S6, and S7 of the first embodiment and therefore the description is omitted here.

Subsequently, a description will be made below for a case in which a user brings a used cartridge 300 to a cartridge store for an exchange.

As shown in FIG. 11D, if a user brings a cartridge having no media to a cartridge store, the EEPROM stored information reader 600 described in the first embodiment reads out desired information (the number of advertisements printed on the media and the number of prints in this embodiment) from the used cartridge 300 brought by the user in step S48.

Subsequently, the number of the advertisements is checked for the used cartridge 300 in addition to a user in step S49 and a discount ticket as shown in FIGS. 12A to 12C is issued on the basis of the number of the advertisements on the media, a discount rate is determined on the basis of this discount ticket, and a price of a cartridge 300 purchased anew is discounted at the determined discount rate in step S50 in this mechanism.

In other words, this embodiment is a discounting system in which a discount rate depends upon the total sum of the number of output logos (advertisements) at printing and the number of prints on the media if the media 303 in the cartridge 300 are used up.

While these embodiments have been described in their preferred form in which the discount ticket is issued by using "reserved media" in the cartridge generally not used for printing to determine the discount rate on the basis of the discount ticket, a user can bring a used cartridge directly to the store without an issue of the discount ticket to get a discount at a discount rate determined there and thus various applications can be made without departing from the objects of the present invention.

(Sixth Embodiment)

A sixth embodiment is a discounting system in which advertisement information on a cartridge is changed to OEM supply information, the data is printed, an advertisement fee is collected from an advertisement client which is a third party, and thereby a user gets a discount of a new cartridge.

In this embodiment, the same processing as for the first embodiment is performed until the media 303 in the cartridge 300 are used up. In other words, the same processing of the steps S1 to S7 in FIG. 4 is performed. Therefore, the description of the processing and the configurations of the printer 100 and the cartridge 300 is omitted here.

Processing after the media 303 in the cartridge are used up is different from that of the first embodiment and therefore the subsequent processing is described by using FIG. 13.

In step S60 shown in FIG. 13, requested advertisement information is written into a data area on a new cartridge 300 by using an OEM advertisement information writer (step S60). The OEM advertisement information writer has the same configuration as for the EEPROM stored information reader 600 shown in FIG. 5.

The new cartridge 300 is discounted after determining a discount rate on the basis of appending information of the advertisement of the previous used cartridge 300 (the advertisement information is a logo of the manufacturer) (step S61).

In addition, the advertisement information of the new cartridge 300 can be replaced with data of a client by the processing in the step S60.

If the media 303 in the cartridge 300 are used up, the number of the advertisement information prints made by the user of the used cartridge 300 is clarified by issuing a discount ticket (with advertisement information data of the client) as described in the second to fifth embodiments. Then, an advertisement fee is collected from the advertisement client according to the number of the information prints.

Furthermore, an amount of the advertisement fee is applied to the discount rate for a user's purchase of a new cartridge 300, by which the user gets a discount of the purchase price of a new cartridge 300 by the discount rate determined based on the advertisement appending information (the number of advertisement prints, the size of the advertisement, the number of advertisements printed on a medium, etc.) in this mechanism (steps S62 and S63).

In other words, a dealer receives an amount equivalent to the discount rate for the user from the advertisement client as a reward for an increased advertisement effect of the advertisement client, by which the discount of the purchase price of the new cartridge is realized in the same manner as for the above embodiments and it further provides a discounting system enabling a user to purchase a new cartridge at a low price.

In addition, by separately providing count values for a plurality of pieces of advertisement information, a user can select preferred information for printing and therefore a dealer can receive amounts corresponding to discount rates for users from each client according to the number of printing times of the advertisement in which the selected information is printed.

While the present invention has been described in its preferred embodiments in which a discount ticket is used as a method of receiving an amount equivalent to a discount rate for a user from an advertisement client by printing the advertisement information of the advertisement client stored in the memory in the cartridge with an image on the media, it is not limited to this method, but many apparently widely different embodiments of the invention can be made without departing from the spirit and the scope thereof, such that a used cartridge is directly brought to a store of the cartridge dealer to get a discount on the basis of memory information as set forth in the first embodiment.

(Flow of Circulation)

Figure 14:
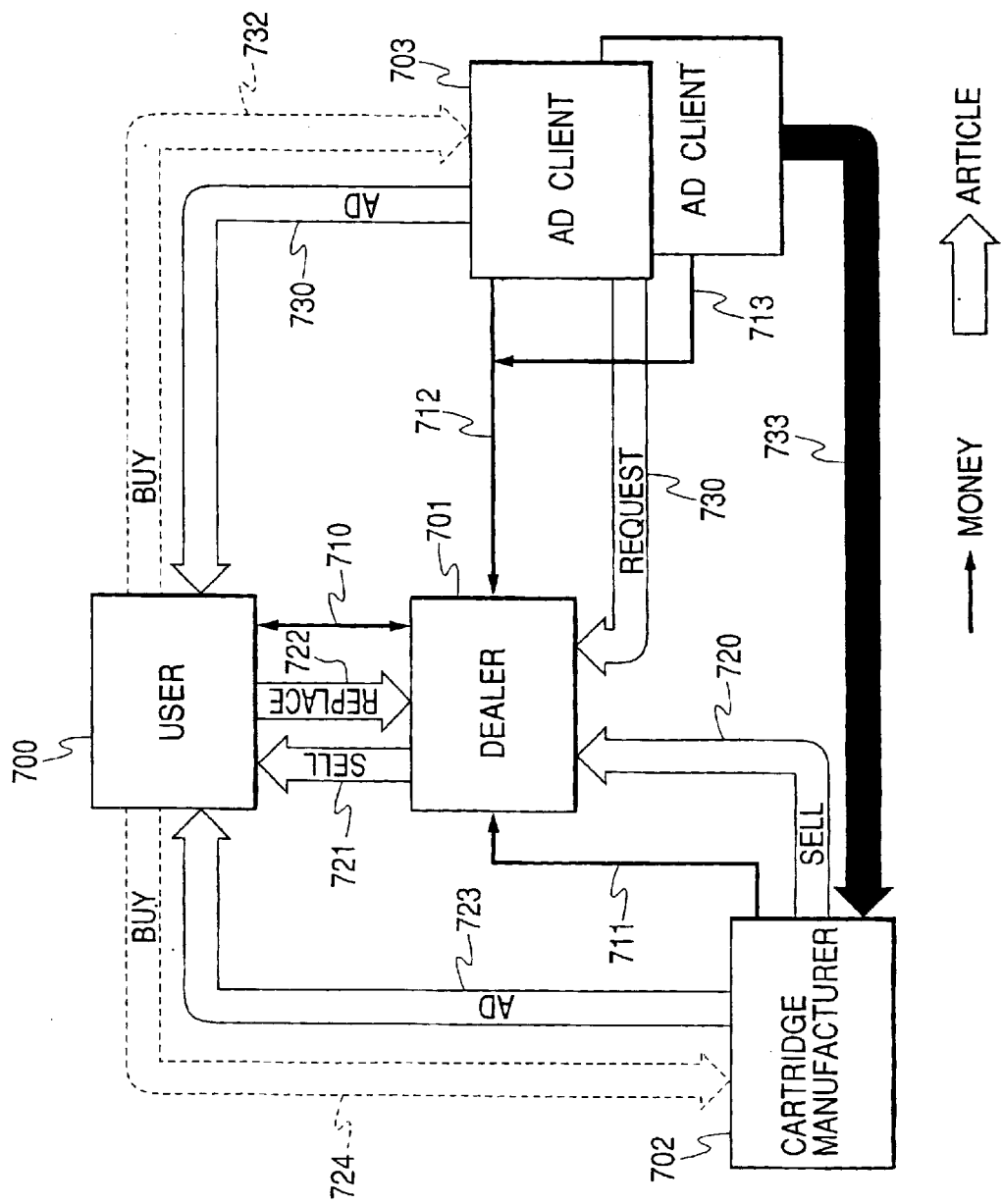
FIG. 14 is a flow diagram illustrating a circulation flow according to the embodiments.

Next, a circulation flow shown in FIG. 14 is described below. This circulation flow is applicable to all cases for a use of a system according to the present invention, in other words, the flow is identical in the first to sixth embodiments while their output methods are different from each other and therefore the flow is described at the end of the description of the preferred embodiments.

Referring to FIG. 14, there is shown a flow of money in an advertisement output in the above embodiments.

A flow will be described first for an advertisement of a manufacturer 702 in a left half of FIG. 14.

The manufacturer 702 sells cartridges wholesale to a store (dealer) 701 (720) and then the dealer 701 sells a cartridge to a user 700 (721).

The user 700 who has purchased the cartridge uses the cartridge after understanding that he or she can get a discount at a next purchase of a new cartridge if an advertisement is appended to an image in printing (this mechanism can be confirmed on the cartridge instruction manual or the like).

If the user 700 approves of printing the advertisement, he or she can get a discount of a price of a cartridge purchased anew on the basis of appending information of the advertisement by checking the appending information of the advertisement (the number of advertisement prints, a size of the advertisement, the number of advertisements on a medium, etc.) printed by the user 700, in the shop 701 with a reader or a discount ticket when bringing a used cartridge to the shop for a cartridge exchange (722) as described in the above embodiments (710).

Who should pay this discount rate of the price of the cartridge purchased anew? The manufacturer (generally, a cartridge manufacturer) 702 having the advertisement information stored in data areas in cartridges achieves the advertisement effect 724 by giving its own advertisement 723 and therefore the manufacturer 702 pays the discount rate as an advertisement fee.

In other words, the dealer 701 can give a discount to the user 700 independently of its own profit by the money (advertisement fee) paid by the manufacturer 702.

In addition as the advertisement effect 724 caused by a commercial or other advertisements 723, if there is a product of the manufacturer 702 when the user 700 wants to purchase any of other products, there can be an effect that the product of the manufacturer 702 may be selected as a candidate.

Next, a description will be made for a flow of an advertisement of an advertisement client 703 other than the manufacturer 702 shown in the right half of FIG. 14.

While the advertisement information of the manufacturer 702 is generally stored in data areas in a cartridge if the cartridge is delivered from the cartridge manufacturer 702 as described in the above, if there is an advertisement client 703 who wants to give another advertisement, the advertisement client obtains a permission of the manufacturer 702 to write advertisement information into the cartridge or of changing the information (733) and then requests the dealer 701 to write new advertisement information of the advertisement client 703 into a data area in the cartridge on the basis of the permission (730). In addition, if the manufacturer writes such advertisement information with an electronic data writing device, advertisement writing productivity may be increased.

The requested dealer 701 writes the advertisement information into the cartridge by using the OEM advertisement writer (FIG. 5). This operation enables the user 700 to print the advertisement information of the third advertisement client 703.

The user 700 who has purchased this cartridge uses the cartridge after understanding that he or she can get a discount at the next purchase of a new cartridge if the advertisement is appended to an image in printing (this mechanism can be confirmed on the cartridge instruction manual or the like).

If the user 700 approves of printing the advertisement, he or she can get a discount of a price of a cartridge purchased anew on the basis of appending information of the advertisement by checking the appending information of the advertisement (the number of advertisement prints, a size of the advertisement, the number of advertisements on a medium, etc.) printed by the user 700 in the shop 701 with a reader or a discount ticket when bringing a used cartridge to the shop for a cartridge exchange (722) as described in the above embodiments (710).

Who should pay this discount rate of the price of the cartridge purchased anew? The advertisement client 703 having the advertisement information stored in data areas in cartridges achieves the advertisement effect 732 by giving its own advertisement 731 and therefore the advertisement client 703 pays the discount rate as an advertisement fee.

In other words, the dealer 701 can give a discount to the user 700 independently of its own profit and of a selling price of the manufacturer 702 by the money (advertisement fee) paid by the advertisement client 703.

In addition as an advertisement effect 732 caused by a commercial or other advertisements 731, if there is a product of the advertisement client 703 when the user 700 wants to purchase any of other products, there can be an effect that the product of the advertisement client 703 may be selected as a candidate.

While the present invention has been described in the first to sixth embodiments in which media and ink are supplied from the cartridge, the cartridge is not limited thereto, but different embodiments can be made such that only one of media and ink is supplied from a cartridge or that only developer is supplied from a cartridge to an image forming apparatus using toner or other developer.

(Seventh Embodiment)

While the invention has been described in its embodiments in which it is determined whether the maximum number of usable sheets of the media 303 (paper or other printing material, media 303) in the cartridge 300 is reached regarding media for printing in S5 in FIG. 4, S14 in FIG. 8, S24 in FIG. 9, and S34 in FIG. 10 set forth in the above, processing of, for example, S14 need not be limited to the determination of whether the logo printing counter has reached the maximum number, but there is assumed an application form in which the processing is replaced with a determination of whether recording agent such as toner or ink contained in a cartridge is used up, in other words, whether the remaining recording agent has been wasted up to a quantity insufficient for the printer to perform a normal printing operation; if Yes is replied, the processing can be replaced with processing of designating that only a little recording agent remains in the cartridge or that there is no remaining recording agent in the cartridge. Correspondingly to this, the processing of S40, S44, S47, and S50 shown in FIGS. 11A to 11D can be replaced with a determination of a discount rate according to information (appending information) read by the EEPROM stored information reader 600. In this context, a discount service is naturally not limited to a discount rate, but can be replaced with a more convenient service for a user, for example, when using discount information for arbitrary or given plural articles.

In addition, while the present invention has been described in its embodiments in which a history of printed logo or other advertisement information is stored in a memory section of a cartridge memory, there is assumed a further application form in which historical information (appending information) of printed advertisement information previously stored in the printer or the cartridge memory is stored in the memory section of the printer.

This enables the discount information to be calculated by using the above described mechanism according to the appending information indicating a printing status of the advertisement information stored in the memory section of the printer when the printer is salvaged, for example.

(Other Embodiments)

The present invention can be applied to either a system comprising a plurality of devices (for example, a host computer, an interface unit, a reader, a printer, etc.) or a device comprising only a single unit (for example, a copier, a facsimile, etc.).

An object of the present invention can be achieved also by providing a device or a personal computer that is an execution subject with a storage medium (or a record medium) containing program codes of software for a procedure of each flowchart for implementing functions of the above embodiments recorded for each device module, user module, or service module according to the execution subject and then reading and executing the program codes stored in the storage medium with the device or the personal computer (or a CPU or an MPU).

In this case, the program codes read from the storage medium implement the functions of the above embodiments and the present invention comprises the storage medium containing the program codes or the program.

In addition, the present invention includes not only an application form in which the functions of the above embodiments are implemented by an execution of the program codes read by the computer, but an application form in which those are implemented by an execution of a part or all of actual processing on the basis of instructions of the program codes with an operating system (OS) running on the computer.

Furthermore, the invention includes an application form in which the program codes read from the storage medium are written into a memory in a feature expansion card inserted into the computer or in a feature expansion unit connected to the computer, and then the CPU in the feature expansion card or the feature expansion unit performs a part of all of the actual processing on the basis of instructions of the program codes, by which the functions of the above embodiments are implemented.

As set forth hereinabove, the present invention provides a mechanism in which advertisement information is stored in a memory section arranged in a cartridge detachably mounted on a printer, by which the advertisement information can be printed and the advertisement can be presented to a user, thereby omitting a complicated work such as an access to an Internet web page to view the advertisement and enabling an advertisement effect to be easily obtained.

In addition, a cartridge is provided with a second memory for storing a printing status of an advertisement printed by a user according to advertisement information stored in a memory section, by which it is possible to leave records of the number of advertisement information prints made by the user, thus enabling a cartridge supply side to acquire information indicating the printing status at a salvage of the cartridge or the like.

Furthermore, a discount ticket for a user's next purchase of a new article can be issued on the basis of the information indicating the printing status stored in the second memory, thereby increasing the buying appetite of a user to promote sales.

Additionally, the information indicating the printing status stored in the second memory can be read from an external device, by which the read information can be used for determining a discount rate for the user's next purchase of a new article, thereby increasing the buying appetite of a user to promote sales, and further assuming that the information indicating the printing status stored in the second memory is read from an external device when the user brings his or her cartridge to a cartridge store, a cartridge salvage operation is also promoted, thereby acquiring an effect contributing to an environmental or recycling improvement.

Furthermore, the advertisement information can be controlled to be printed with other image information, thereby enabling a user to print the advertisement information with a desired image.

Still further, a user can select whether advertisement information should be printed and thus he or she can print the advertisement information, if necessary.

In addition, with a cartridge provided with a first memory section detachably mounted on a printer for storing advertisement information and a second memory section for storing appending information of an advertisement corresponding to the advertisement information appended to media at user's printing, the user can bring the information stored in the first memory section and the second memory section together with the cartridge when it is used up.

What is claimed is:

1. A discounting system, said system comprising:
   first memory means for storing advertisement information;
   advertisement appending means provided in a printer for appending an advertisement based on the advertisement information stored in said first memory means to media together with a given image to be printed;
   second memory means for storing appending information of the advertisement appended by said advertisement appending means to the media;
   discount ticket issuing means for issuing discount tickets according to the appending information stored in said second memory means; and
   discount rate determination means for determining a discount rate of a purchase price of a new article on the basis of the discount ticket issued by said discount ticket issuing means,
   wherein the advertisement information previously stored in said first memory means is supplied by an advertisement supplier and said discounting system further comprises advertisement fee calculation means for calculating an advertisement fee paid by the advertisement supplier according to the discount rate of the purchase price of a new cartridge.

2. A discounting system according to claim 1, wherein said discount ticket issuing means issues the discount ticket when a cartridge has no remaining material.

3. A discounting system according to claim 1, wherein the discount ticket issued by said discount ticket issuing means has a record of the advertisement appending information stored by said second memory means.

4. A discounting system according to claim 2, wherein the discount ticket issued by said discount ticket issuing means is a multiple cutoff-type discount ticket whose quantity depends upon the advertisement appending information stored in said second memory means.

5. A discounting system according to claim 3, wherein the discount ticket issued by said discount ticket issuing means also has a record of an ID of the printer in which the cartridge has been installed.

6. A discounting system according to claim 1, wherein the advertisement appending information stored in said second memory means is size information of the advertisement appended to the media by said advertisement appending means.

7. A discounting system according to claim 1, wherein the advertisement appending information stored in said second memory means is quantity information of the advertisement appended to the media by said advertisement appending means.

8. A discounting system according to claim 1, wherein the advertisement information previously stored in said first memory means is information of a plurality of advertisements supplied by a plurality of advertisement suppliers and said advertisement fee calculation means individually calculates the advertisement fee paid by each advertisement supplier on the basis of the appending information of each advertisement.

9. A discounting system according to claim 1, further comprising mode selection means for selecting whether said advertisement appending means appends the advertisement to the media for printing or the advertisement is not appended for printing.

10. A benefit providing system, said system comprising:
    first memory means for storing advertisement information;
    advertisement print means for printing an advertisement based on the advertisement information stored in said first memory means together with a given print data on media when the given image print data is printed;
    second memory means, provided in a cartridge detachably mounted on a printer, for storing history information indicating that the advertisement is printed by said advertisement print means;
    acquisition means for acquiring the history information stored in said second memory means; and
    benefit information determination means for determining benefit information according to the history information acquired by said acquisition means.

11. A benefit providing system according to claim 10, wherein said first memory means is a cartridge detachably mounted on a printer or is provided in the printer.

12. A benefit providing system according to claim 10, wherein said first memory means and said second memory means are provided in the cartridge and they comprise their own memory sections, respectively.

13. A benefit providing system according to claim 10, wherein the advertisement comprises a logo mark.

14. A benefit providing system according to claim 10, further comprising discrimination means for discriminating whether an advertisement appending mode is designated and control means for controlling said second memory means to store the history information if said discrimination means discriminates that the advertisement appending mode is designated.

15. A benefit providing system according to claim 10, wherein the benefit information determined by said benefit information determination means is discount information.

16. A benefit providing system according to claim 15, wherein the discount information includes at least one of a discount or a free provision of an article when a given number of points are accumulated, or a discount rate.

17. A benefit providing device, said device comprising:
acquisition means for acquiring history information of printing an advertisement based on advertisement information stored in a memory section of a cartridge mounted on a printer together with given print data to a media from the memory section of the cartridge; and
benefit information determination means for determining benefit information on the basis of the history information acquired by said acquisition means.

18. A benefit providing device according to claim 17, wherein the advertisement comprises a logo mark.

19. A benefit providing device according to claim 17, wherein the printer has control means for controlling the cartridge memory section to store the history information in an advertisement appending mode.

20. A benefit providing system according to claim 17, wherein the benefit information determined by said benefit information determination means is discount information.

21. A benefit providing device according to claim 20, wherein the discount information includes at least one of a discount or a free provision of an article when a given number of points are accumulated, or a discount rate.

22. A cartridge detachably mounted on a printer, said cartridge comprising:
recording agent container means for containing a recording agent for printing on media; and
memory means for storing history information of appending an advertisement based on advertisement information stored in a given memory section to the media together with a given print data when the given print data is printed,
wherein the history information stored in said memory means is read by a reader and used for determining benefit information by using the reader.

23. A cartridge according to claim 22, wherein the given memory section is a cartridge or is provided in the printer.

24. A cartridge according to claim 22, wherein the advertisement comprises a logo mark.

25. A cartridge according to claim 22, wherein the benefit information determined by the reader is discount information.

26. A cartridge according to claim 25, wherein the discount information includes at least one of a discount or a free provision of an article when a given number of points are accumulated, or a discount rate.

27. A print controller, said controller comprising:
readout means for reading out advertisement information stored in a first memory section;
print control means for printing and controlling the advertisement information read out by said readout means together with given print data on media when the print data is printed; and
memory control means for storing history information indicating an appending history of an advertisement based on the advertisement information stored in the first memory section into a second memory section provided in a cartridge detachably mounted on a printer,
wherein the history information is used for determining benefit information.

28. A print controller according to claim 27, wherein said print controller issues a discount ticket for a user to purchase an article and controls the printing on the basis of the history information.

29. A print controller according to claim 27, wherein the history information stored in the second memory section by said memory control means can be read from an external device and the history information read to the external device is used for benefit information.

30. A print controller according to claim 27, wherein said print control means causes the history information stored in the second memory section provided in the cartridge to be printed together with print data transmitted externally.

31. A print controller according to claim 27, further comprising discrimination means for discriminating whether an advertisement appending mode is designated and control means for controlling the second memory section to store the history information if said discrimination means discriminates that the advertisement appending mode is designated.

32. A print controller according to claim 27, wherein the first memory section is provided in a printer.

33. A print controller according to claim 27, wherein each of the first memory section and the second memory section comprises a physically single memory device.

34. A print controller according to claim 27, wherein the advertisement comprises a logo mark.

35. A print controller according to claim 27, wherein the determined benefit information is discount information.

36. A print controller according to claim 35, wherein the discount information includes at least one of a discount or a free provision of an article when a given number of points are accumulated, or a discount rate.

37. A discounting method, said method comprising:
a readout step, of reading advertisement information;
an appending step, of appending an advertisement based on the advertisement information read in said readout step to media together with a given image to be printed at printing on the media;
a storing step, of storing the appending information of the advertisement appended in said appending step;
a discount ticket issuing step, of issuing a discount ticket on the basis of the appending information stored in said second storing step; and
a discount rate determination step, of determining a discount rate of a purchase price of a new cartridge article on the basis of the discount ticket issued in said discount ticket issuing step at purchasing the new article,
wherein the advertisement information readout in said readout step is supplied by an advertisement supplier and said discounting method further comprises an advertisement fee calculation step, of calculating an advertisement fee paid by the advertisement supplier according to the discount rate of the purchase price of a new cartridge.

38. A benefit providing method, said method comprising:
a readout step, of reading advertisement information;
an appending step, of printing an advertisement based on advertisement information read in said readout step together with a given print data when the given print data is printed;
a storing step, of storing history information generated in said appending step into a memory unit provided in a cartridge detachably mounted on a printer;
an acquisition step, of acquiring the history information stored in said storing step; and
a benefit information determination step, of determining benefit information on the basis of the history information acquired in said acquisition step.

39. A benefit providing method according to claim 38, wherein the benefit information determined in said benefit information determination step is discount information.

40. A benefit providing method according to claim 39, wherein the discount information includes at least one of a discount or a free provision of an article when a given number of points are accumulated, or a discount rate.

41. A benefit providing method, said method comprising:
an acquisition step, of acquiring history information of printing an advertisement based on advertisement information stored in a memory section of a cartridge mounted on a printer together with given print data to a media from the memory section of the cartridge; and
a benefit information determination step, of determining benefit information on the basis of the appending information acquired in said acquisition step.

42. A benefit providing method according to claim 41, wherein the benefit information determined in said benefit information determination step is discount information.

43. A benefit providing method according to claim 42, wherein the discount information includes at least one of a discount or a free provision of an article when a given number of points are accumulated, or a discount rate.

44. A print control method, said method comprising:
a readout step, of reading advertisement information stored in a first memory section;
a print controlling step, of printing and controlling the advertisement information read in said readout step; and
a storing step, of storing history information indicating an appending history of an advertisement based on the advertisement information stored in the first memory section into a second memory section provided in a cartridge detachably mounted on a printer,
wherein the history information is used for determining benefit information.

45. A print control method according to claim 44, wherein the determined benefit information is discount information.

46. A print control method according to claim 45, wherein the discount information includes at least one of a discount or a free provision of an article when a given number of points are accumulated, or a discount rate.

47. A discounting program to be executed by a computer, said program comprising:
code for a readout step, of reading advertisement information;
code for an appending step, of appending an advertisement based on the advertisement information read in said readout step to media together with a given image to be printed at printing on the media;
code for a storing step, of storing the appending information of the advertisement appended in said appending step;
code for a discount ticket issuing step, of issuing a discount ticket on the basis of the appending information stored in said second storing step; and
code for a discount rate determination step, of determining a discount rate of a purchase price of a new article on the basis of said discount ticket issued in said discount ticket issuing step when the new article is purchased,
wherein the advertisement information readout in said readout step is supplied by an advertisement supplier and said program further comprises code for an advertisement fee calculation step, of calculating an advertisement fee paid by the advertisement supplier according to the discount rate of the purchase price of a new cartridge.

48. A benefit providing program to be executed by a computer, said program comprising:
code for a readout step, of reading advertisement information;
code for an appending step, of printing an advertisement based on the advertisement information read in said readout step together with a given print data when the given print image is printed;
code for a storing step, of storing history information generated in said appending step into a memory unit provided in a cartridge detachably mounted on a printer;
code for an acquisition step, of acquiring the history information stored in said storing step; and
code for a benefit information determination step, of determining benefit information on the basis of the appending history information acquired in said acquisition step.

49. A benefit providing program according to claim 48, wherein the benefit information determined by said benefit information determination code is discount information.

50. A benefit providing program according to claim 49, wherein the discount information includes at least one of a discount or a free provision of an article when a given number of points are accumulated, or a discount rate.

51. A benefit providing program to be executed by a computer, said program comprising:
code for an acquisition step, of acquiring history information of printing an advertisement based on advertisement information stored in a memory section of a cartridge mounted on a printer together with given print data to a media from the memory section of the cartridge; and
code for a benefit information determination step, of determining benefit information on the basis of the appending information acquired in said acquisition step.

52. A benefit providing program according to claim 51, wherein the benefit information determined by said benefit information determination code is discount information.

53. A benefit providing program according to claim 52, wherein the discount information includes at least one of a discount or a free provision of an article when a given number of points are accumulated, or a discount rate.

54. A print control program to be executed by a computer, said program comprising:
   code for a readout step, of reading advertisement information stored in a first memory section;
   code for a print controlling step, of printing and controlling the advertisement information read in said readout step; and
   code for a storing step, of storing history information indicating an appending history of an advertisement based on the advertisement information stored in the first memory section into a second memory section provided in a cartridge detachably mounted on a printer,
   wherein the history information is used for determining benefit information.

55. A print control program according to claim 54, wherein the determined benefit information is discount information.

56. A print control program according to claim 55, wherein the discount information includes at least one of a discount or a free provision of an article when a given number of points are accumulated, or a discount rate.

57. A benefit providing system, said system comprising:
   first memory means for storing advertisement information;
   advertisement appending means for appending an advertisement based on the advertisement information stored in said first memory means together with a given image on a media when the given image is printed;
   second memory means for storing appending information indicating that the advertisement is appended by said advertisement appending means;
   acquisition means for acquiring the appending information stored in said second memory means;
   benefit information determination means for determining benefit information according to the appending information acquired by said acquisition means; and
   fee calculation means for calculating an advertisement fee to be paid by an advertisement supplier on the benefit information determined by said benefit information determination means.

58. A benefit providing system according to claim 57, wherein the benefit information determined by said benefit information determination means is discount information.

59. A benefit providing system according to claim 58, wherein the discount information includes at least one of a discount or a free provision of an article when a given number of points are accumulated, or a discount rate.

60. A cartridge detachably mounted on a printer, said cartridge comprising:
   recording agent container means for containing a recording agent for printing on a media;
   memory means for storing appending information of appending an advertisement based on advertisement information stored in a given memory section to the media together with a given image when the given image is printed, wherein the appending information stored in said memory means is read by a reader and used for determining benefit information by using the reader; and
   fee calculation means for calculating an advertisement fee to be paid by an advertisement supplier based on the determined benefit information.

61. A cartridge according to claim 60, wherein the benefit information determined by the reader is discount information.

62. A cartridge according to claim 61, wherein the discount information includes at least one of a discount or a free provision of an article when a given number of points are accumulated, or a discount rate.

63. A print controller, said controller comprising:
   readout means for reading out advertisement information stored in a first memory section;
   print control means for printing and controlling the advertisement information read out by said readout means;
   memory control means for storing appending information indicating an appending status of an advertisement based on the advertisement information stored in the first memory section into a second memory section provided in a cartridge detachably mounted on a printer, wherein the appending information is used for determining benefit information; and
   fee calculation means for calculating an advertisement feed to be paid by an advertisement supplier based on the determined benefit information.

64. A print controller according to claim 63, wherein the determined benefit information is discount information.

65. A print controller according to claim 64, wherein the discount information includes at least one of a discount or a free provision of an article when a given number of points are accumulated, or a discount rate.

* * * * *